US012327718B2

(12) United States Patent
Booth et al.

(10) Patent No.: US 12,327,718 B2
(45) Date of Patent: Jun. 10, 2025

(54) OUTER SOURCE ASSEMBLY AND ASSOCIATED COMPONENTS

(71) Applicant: Micromass UK Limited, Wilmslow (GB)

(72) Inventors: Alastair Booth, Glossop (GB); Alvin Chua, Singapore (SG); Carl Chen, Victoria (AU); Marcus Dawber, Wilmslow (GB); Pham Hoang Vu Ngo, Singapore (SG); William Ngo, Singapore (SG); Dennis Ong, Singapore (SG); Richard Tyldesley-Worster, Wilmslow (GB); Arvind Rangan, Singapore (SG); Steven Rocha, Singapore (SG)

(73) Assignee: Micromass UK Ltd. (GB)

( * ) Notice: Subject to any disclaimer, the term of this patent is extended or adjusted under 35 U.S.C. 154(b) by 0 days.

(21) Appl. No.: 18/816,188

(22) Filed: Aug. 27, 2024

(65) Prior Publication Data

US 2024/0420942 A1 Dec. 19, 2024

Related U.S. Application Data

(63) Continuation of application No. 17/057,731, filed as application No. PCT/GB2019/051487 on May 31, 2019, now Pat. No. 12,106,952.

(30) Foreign Application Priority Data

Jun. 1, 2018 (SG) .......................... 10201804687X
Jul. 2, 2018 (GB) .................................... 1810824

(51) Int. Cl.
*H01J 49/06* (2006.01)

(52) U.S. Cl.
CPC .......... *H01J 49/068* (2013.01); *H01J 49/067* (2013.01)

(58) Field of Classification Search
CPC ......... H01J 49/068; H01J 49/067; H01J 49/10
See application file for complete search history.

(56) References Cited

U.S. PATENT DOCUMENTS 5,068,534 A 11/1991 Bradshaw et al.
6,423,965 B1 7/2002 Hashimoto et al.
(Continued)

FOREIGN PATENT DOCUMENTS

CA 2755661 A1 9/2010
CN 102027566 A 4/2011
(Continued)

OTHER PUBLICATIONS

International Search Report and Written Opinion in PCT/GB2019/051487 mailed on Dec. 5, 2019.
(Continued)

*Primary Examiner* — David E Smith
*Assistant Examiner* — Hsien C Tsai
(74) *Attorney, Agent, or Firm* — Schmeiser, Olsen & Watts LLP

(57) ABSTRACT

A lens assembly for an outer source of a mass spectrometer, the assembly comprising: a housing; a plurality of lens elements, each lens element comprising a radially extending electrically conductive protrusion, the lens elements being linearly arranged in the housing such that the protrusions are aligned with one another, and an interface connector having a plurality of sockets to receive the protrusions therein and create an electrical connection between the protrusions and sockets. A housing for a resistance temperature detector is also disclosed.

13 Claims, 11 Drawing Sheets

(56) References Cited

U.S. PATENT DOCUMENTS

| | | | | |
|---|---|---|---|---|
| 6,576,898 | B2 | 6/2003 | Waki | |
| 6,888,129 | B2 | 5/2005 | Bowdler et al. | |
| 7,041,970 | B2 | 5/2006 | Bowdler et al. | |
| 7,265,368 | B2 | 9/2007 | Martin, III | |
| 7,351,959 | B2 | 4/2008 | Hayden et al. | |
| 7,385,186 | B2 | 6/2008 | Hayden et al. | |
| 7,405,396 | B2 | 7/2008 | Cygan et al. | |
| 7,709,790 | B2 | 5/2010 | Guckenberger et al. | |
| 8,003,935 | B2 | 8/2011 | Robinson et al. | |
| 8,003,936 | B2 | 8/2011 | Robinson et al. | |
| 8,294,089 | B2 * | 10/2012 | Suzuki | H01J 49/025 250/281 |
| 8,334,505 | B2 | 12/2012 | Robinson et al. | |
| 8,389,934 | B2 | 3/2013 | Dzepina et al. | |
| 8,704,171 | B2 | 4/2014 | Robinson et al. | |
| 9,117,617 | B2 | 8/2015 | Russ, IV et al. | |
| 9,589,776 | B2 | 3/2017 | Chaudhary et al. | |
| 12,106,952 | B2 * | 10/2024 | Booth | H01J 49/068 |
| 2002/0148959 | A1 | 10/2002 | Weiss et al. | |
| 2009/0189067 | A1 | 7/2009 | Morrisroe et al. | |
| 2009/0242747 | A1 | 10/2009 | Guckenberger et al. | |
| 2010/0024183 | A1 | 2/2010 | Cuprys | |
| 2010/0243881 | A1 | 9/2010 | Dzepina et al. | |
| 2016/0084716 | A1 | 3/2016 | Sun | |
| 2016/0172146 | A1 | 6/2016 | Wang | |
| 2017/0200538 | A1 | 7/2017 | Mitchell et al. | |
| 2018/0182605 | A1 | 6/2018 | Mollison et al. | |

FOREIGN PATENT DOCUMENTS

| | | | |
|---|---|---|---|
| CN | 103268851 | A | 8/2013 |
| CN | 203310527 | U | 11/2013 |
| CN | 104241076 | A | 12/2014 |
| CN | 106062623 | A | 10/2016 |
| CN | 206179824 | U | 5/2017 |
| CN | 106803870 | A | 6/2017 |
| CN | 107690594 | A | 2/2018 |
| CN | 107710380 | A | 2/2018 |
| CN | 207068790 | U | 3/2018 |
| GB | 2506143 | A | 3/2014 |
| GB | 2549495 | A | 10/2017 |
| WO | 1992020001 | A1 | 11/1992 |
| WO | 2006124095 | A2 | 11/2006 |
| WO | 2006124096 | A2 | 11/2006 |
| WO | 2006124097 | A2 | 11/2006 |
| WO | 2006124098 | A2 | 11/2006 |
| WO | 2009048739 | A2 | 4/2009 |
| WO | 2009123914 | A1 | 10/2009 |
| WO | 2010111552 | A1 | 9/2010 |
| WO | 2014197341 | A2 | 12/2014 |
| WO | 2016149658 | A1 | 9/2016 |
| WO | 2017002936 | A1 | 1/2017 |
| WO | 2017221703 | A1 | 12/2017 |
| WO | 2017221707 | A1 | 12/2017 |

OTHER PUBLICATIONS

Search Report in UK Patent Application No. GB1810824.1 mailed on Feb. 1, 2019.

Combined Search and Examination Report in UK Patent Application No. GB1810824.1 mailed on Dec. 31, 2018.

Combined Search and Examination Report in UK Patent Application No. GB1907755.1 mailed on Oct. 31, 2019.

Search Report in UK Patent Application No. GB1810824.1 mailed on Feb. 27, 2019.

Combined Search and Examination Report in UK Patent Application No. GB2000977.5 mailed on May 15, 2020.

Notice of Allowance in U.S. Appl. No. 17/057,731 mailed on Jul. 2, 2024.

* cited by examiner

OUTER SOURCE ASSEMBLY AND ASSOCIATED COMPONENTS

RELATED APPLICATIONS

This application is a continuation of U.S. patent application Ser. No. 17/057,731 filed on Nov. 23, 2020, which is a 371 National Stage of international patent application no. PCT/GB2019/051487 filed on May 31, 2019, which claims priority to United Kingdom patent application no. 1810824.1 filed on Jul. 2, 2018, and Singapore patent application no. 1021804687X filed on Jun. 1, 2018.

BACKGROUND TO THE INVENTION

The present invention relates to an outer source assembly and associated components, including a lens assembly and a housing for a resistance temperature detector.

Gas chromatography (GC) is a well-known analytical separation technique. A column containing a stationary phase is arranged in a GC oven. A sample is introduced into the column along with a mobile phase (carrier gas) and heated by the GC oven. The sample interacts with the stationary phase in the column and the components of the sample elute from the end of the column at different rates depending on their chemical and physical properties and affinity to the stationary phase. The mobile phase may comprise, for example, an inert or non-reactive gas such as helium or nitrogen.

It is known to interface the GC oven with a mass spectrometer (MS)—a so-called GC/MS system arrangement—for analysis of the separated components of the sample.

Generally speaking, a mass spectrometer comprises an ion source, a mass analyser and a detector. There are different types of ion sources. The ion source of a mass spectrometer of the type referred to in this specification includes an inner source assembly and an outer source assembly. The incoming components (GC eluent) of the sample from the GC are first introduced into the inner source assembly. Here, they are ionised by an ion source, upon colliding with electrons emitted by one or more filaments and are then emitted towards the outer source assembly which guides the ions through a series of ion lenses (extraction lens stack) towards an analyser and detector of the mass spectrometer. The extraction lens stack is typically secured to the analyser housing. In use, the inner source assembly mates with the outer source assembly.

The inner source may adopt one of a number of types of ion source, including electron ionisation (EI) and chemical ionisation (CI). The sample enters the ion source from the gas chromatography column into a volume of an inner source housing adjacent one or more filaments. Electrons emitted by the filament(s) interact with the sample molecules which serve to ionise them. A charged repeller then repels the ions towards the lens stack of the outer source assembly.

Aspects of the inventions disclosed herein relate generally to improvements to the various components of the outer source assembly. The terms 'inner source' and 'outer source' are used herein, in line with the above general definition, to increase clarity. Nevertheless, the respective components of the inner and outer source assemblies are likewise components of the source assembly as a whole.

Mass spectrometers are highly sensitive and accurate pieces of apparatus, and require regular maintenance and cleaning in order to maintain their optimal conditions of operation. It is beneficial if at least some of the maintenance can be carried out by a lab technician, on site, using conventional tools (if any). There is a desire to ensure that the maintenance is as straightforward as possible, reducing the opportunities for errors, minimising down time of the apparatus, and ensuring that the mass spectrometer operates effectively when reassembled.

SUMMARY OF THE INVENTION

Accordingly, one aspect of the present invention provides a lens assembly for an outer source of a mass spectrometer, the assembly comprising:

a housing;

a plurality of lens elements, each lens element comprising a radially extending electrically conductive protrusion, the lens elements being linearly arranged in the housing such that the protrusions are aligned with one another; and an interface connector having a plurality of sockets to receive the protrusions therein and create an electrical connection between the protrusions and sockets.

In at least one embodiment, the housing is substantially cylindrical.

In at least one embodiment, the housing is comprised of an electrically insulating material.

In at least one embodiment, the housing is comprised of ceramic or an engineering polymer.

In at least one embodiment, the housing is comprised of one of PEEK, alumina, zirconia, macor, shapel, zerodur, ultem and Vespel.

In at least one embodiment, the housing comprises a slot extending longitudinally for slidably receiving the protrusions of each lens element during assembly.

In at least one embodiment, the lens elements are electrostatic.

In at least one embodiment, at least a first lens element is held at a different electrical potential to a second lens element.

In at least one embodiment, the lens elements are comprised at least in part of metal or metal alloy.

In at least one embodiment, the interface connector is substantially planar and is arranged generally perpendicularly to the axes of the protrusions.

In at least one embodiment, the interface connector is a PCB.

In at least one embodiment, the PCB is comprised at least in part of ceramic or one of Rogers 4000 Series laminates.

In at least one embodiment, the interface connector comprises two plates which are sandwiched together to define sockets to receive the protrusions.

In at least one embodiment, the plane of the interface connector is parallel to the protrusions.

In at least one embodiment, the lens assembly further comprises a plurality of spacers, each spacer being arranged in the housing between a pair of adjacent lens elements.

In at least one embodiment, the spacers are formed of substantially thermally and/or electrically insulating material.

In at least one embodiment, at least one of the lens elements and/or spacers comprise opposing axial faces, each face provided with one of a keying protrusion and a keying recess, to engage with a corresponding keying recess or keying protrusion on an adjacent lens element and/or spacer.

In at least one embodiment, the keying protrusions and/or keying recesses are uniquely positioned in each lens element and/or spacer.

In at least one embodiment, the lens elements and/or spacers are only receivable in the housing in a single orientation and sequence.

In at least one embodiment, the housing comprises at least one locating protrusion, and the interface panel comprises an alignment aperture to receive the locating protrusion.

In at least one embodiment, the lens assembly further comprises at least one heater to selectively heat one or more of the lens elements.

In at least one embodiment, the lens assembly further comprises at least one heater associated with each lens element to selectively heat the associated lens element.

In at least one embodiment, the lens assembly further comprises a source block.

In at least one embodiment, the lens assembly further comprises a heater associated with the source block.

In at least one embodiment, at least a part of the surface of the source block is coated.

In at least one embodiment, the coating is one of anodized aluminium, titanium nitride and diamond-like carbon (DLC).

In at least one embodiment, the lens assembly further comprises an insulator arranged between the source block and housing.

In at least one embodiment, the insulator is formed at least in part of one of PEEK, alumina, zirconia, macor, shapel, zerodur, ultem and Vespel.

In at least one embodiment, the lens assembly further comprises a cover which at least partially house the interface connector.

In at least one embodiment, the cover is formed of PEEK.

In at least one embodiment, the interface connector is removably secured to the housing with a single screw.

In at least one embodiment, the lens elements or spacers comprise an axially extending boss configured to be received in a corresponding aperture in the other of the spacers or lens element, to provide axial alignment between the lens elements and the spacers.

In at least one embodiment, the lens elements and/or spacers comprise keying protrusions and corresponding alignment slots.

In at least one embodiment, the lens assembly further comprises at least one yoke pedestal for receiving at least one magnetic element thereon.

In at least one embodiment, the at least one yoke pedestal is securable to one of the lens elements.

In at least one embodiment, the lens assembly further comprises a wiring loom.

In at least one embodiment, the wiring loom is connected at a first end to the interface connector and at a second end to at least one connector for communication with a component of the lens assembly.

In another aspect of the present invention, there is provided a mass spectrometer comprising a housing having an electrical socket interface, further comprising a lens assembly embodying the invention, further comprising a connector lead connected between the electrical socket interface on the mass spectrometer housing and the interface connector of the lens assembly.

In another aspect of the present invention, there is provided a lens assembly for an outer source of a mass spectrometer, the assembly comprising:

- a plurality of lens elements; and
- a plurality of spacers, interspersed between the lens elements to form a lens stack with a spacer between each neighbouring pair of lens elements,
- wherein each of the lens elements and spacers comprise opposing first and second axial faces,
- wherein at least one axial face of a lens element or spacer comprises one of a pair of complementary keying features and the opposing axial face of a neighbouring spacer comprises the other of the pair of complementary keying features.

In at least one embodiment, the pairs of complementary keying features are unique to the lens assembly.

In at least one embodiment, the lens elements and spacers may only be mated with one another in a predetermined single configuration.

In another aspect of the present invention, there is provided a housing for a resistance temperature detector having a detector module and an extension cable, the housing comprising:

- a housing body having a cavity to receive the detector module;
- a first fastener to removably secure the extension cable of the detector to the housing; and
- a second fastener to removably secure the detector module in the housing.

In at least one embodiment, the first fastener is a threaded grub screw received in a threaded aperture in the housing body.

In at least one embodiment, the tip of the first fastener is substantially flat.

In at least one embodiment, the second fastener is a ball plunger, configured to apply a predetermined force on the detector module.

In at least one embodiment, the second fastener is a spring, configured to apply a predetermined force on the detector module.

In at least one embodiment, the base of the housing body is open, and the second fastener applies a force to the detector module to urge it into thermal contact with a surface to be measured.

In at least one embodiment, the base of the housing body is closed, and the second fastener applies a force to the detector module to urge it into contact with the base of the housing body.

In at least one embodiment, the housing body comprises aluminium alloy or nickel-aluminium-bronze alloy.

In at least one embodiment, the housing comprises a mounting flange provided with apertures for securing the housing to a surface to be measured.

In at least one embodiment, the housing body comprises an access aperture for receiving the detector therein.

In at least one embodiment, the access aperture is on the side of the body, extending generally between the first and second fasteners.

In at least one embodiment, the detector module comprises a detector body and a sensing element, wherein the sensing element extends from the detector body.

In at least one embodiment, the second fastener is configured to removably secure the sensing element in the housing.

In at least one embodiment, the second fastener is configured to apply a predetermined force on the sensing element.

BRIEF DESCRIPTION OF THE DRAWINGS

Embodiments of the present invention will now be described, by way of non-limiting example only, with reference to the figures in which.

DETAILED DESCRIPTION OF EMBODIMENTS OF THE INVENTION

Lens Assembly

Figure 1:
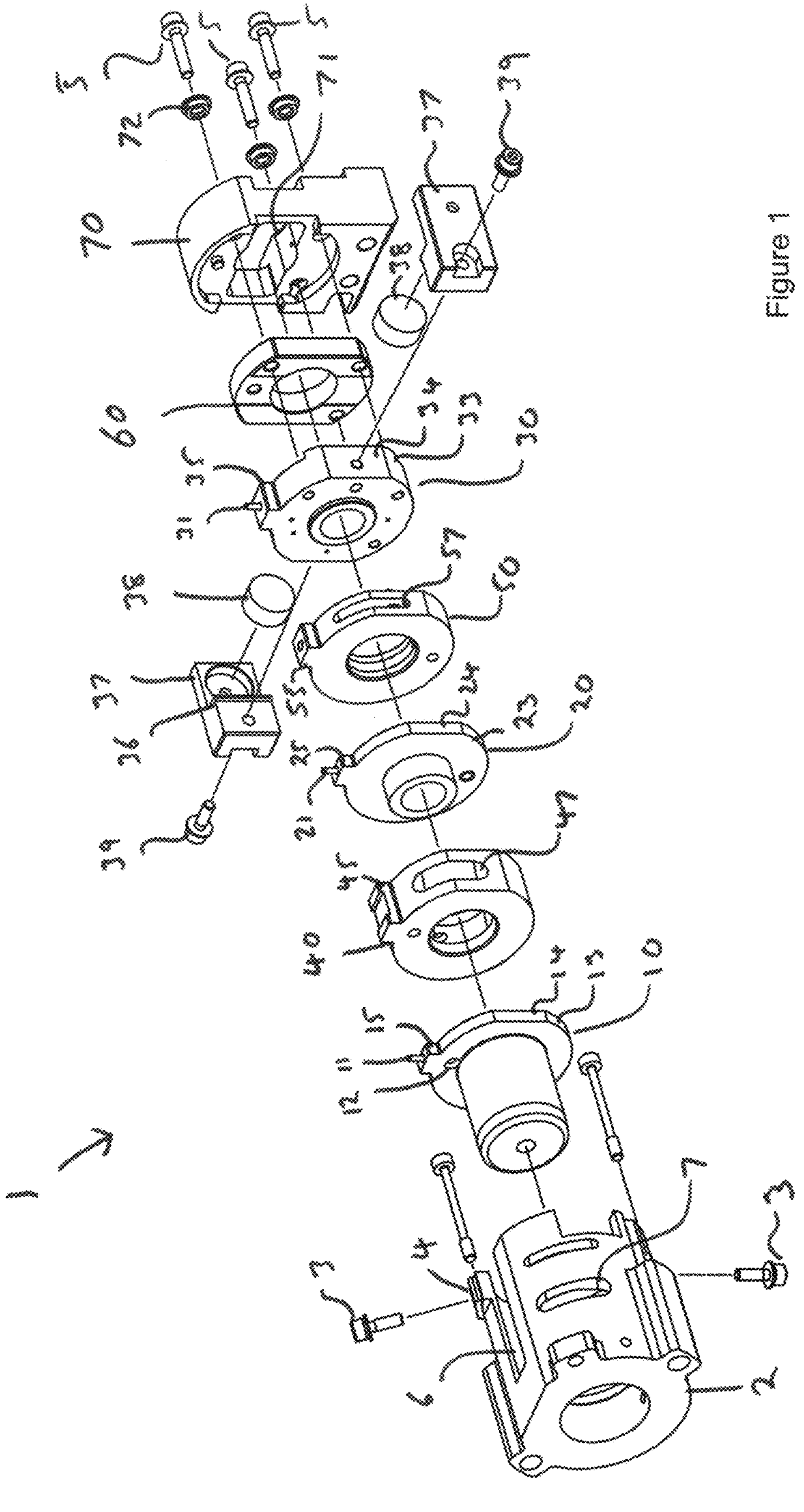
FIG. 1 illustrates an exploded view of part of a lens assembly embodying the present invention.
Figure 2:
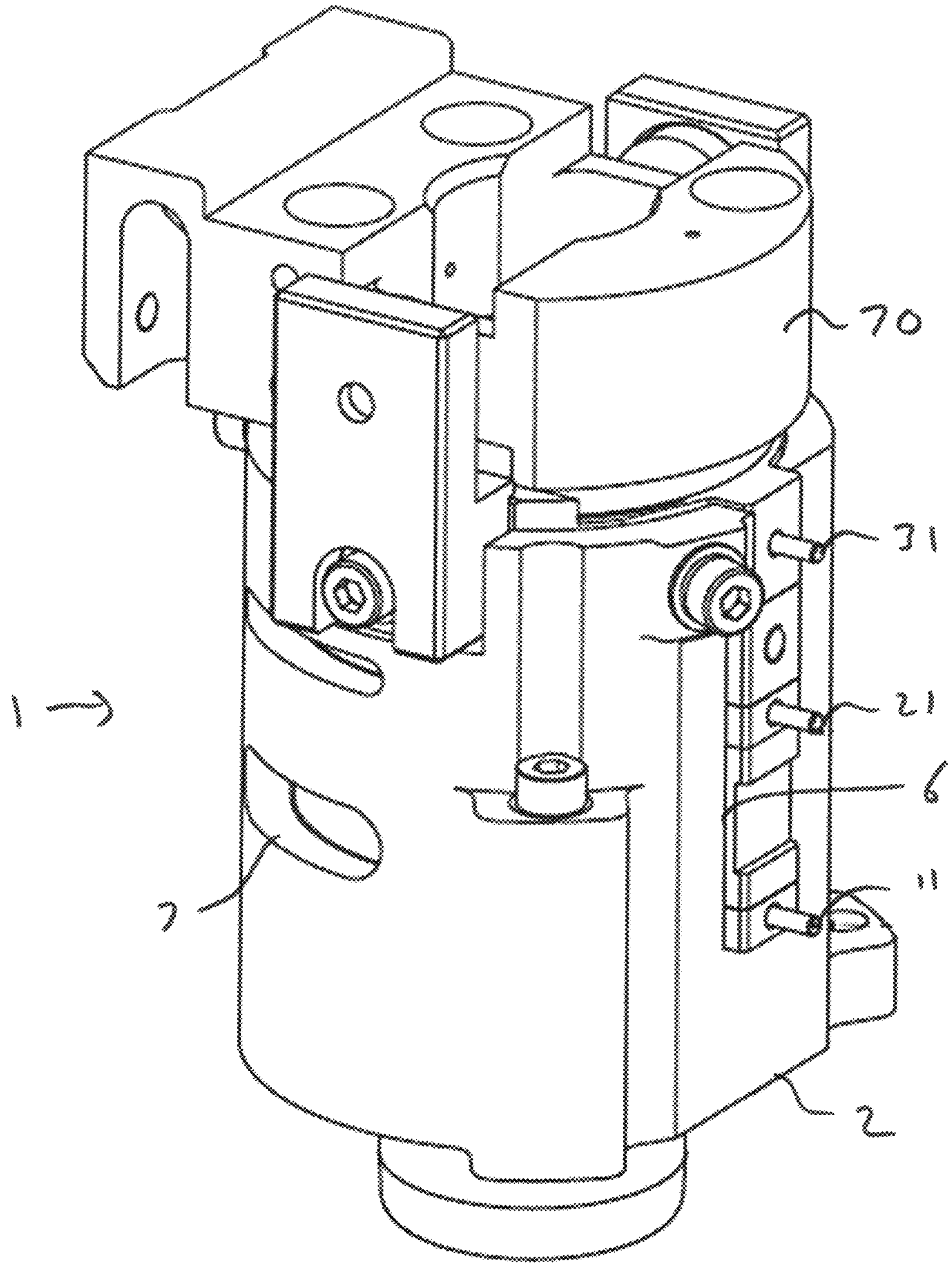
FIG. 2 illustrates part of a lens assembly embodying the present invention.
Figure 7:
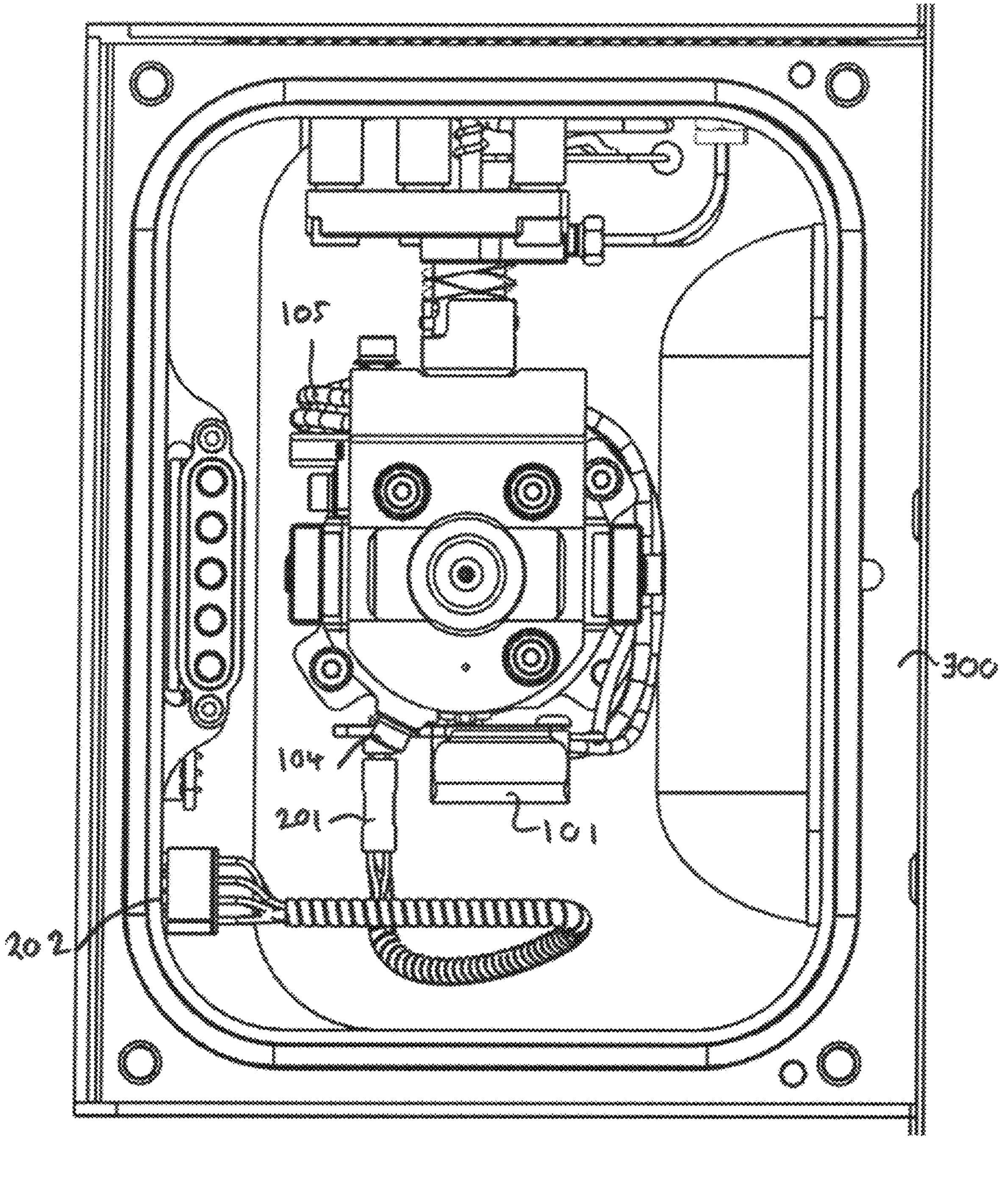
FIG. 7 illustrates a lens assembly assembled in a mass spectrometer housing.

FIGS. 1 and 2 illustrate a lens assembly 1 for an outer source of a mass spectrometer 300 (see FIG. 7). The lens assembly 1 comprises a housing 2. The lens assembly 1 further comprises a plurality of lens elements 10, 20, 30, each comprising a radially extending electrically conductive protrusion 11, 21, 31. When assembled, the lens elements 10, 20, 30 are linearly arranged in the housing 2 such that the protrusions 11, 21, 31 are aligned with one another. Further, the lens assembly 1 comprises an interface connector 100 (See FIGS. 4 and 5) having a plurality of sockets 111, 121, 131 to receive the protrusions 11, 21, 31 therein and create an electrical connection (e.g. for voltage, power and/or data transfer) between the protrusions 11, 21, 31 and sockets 111, 121, 131.

In at least one embodiment, the housing 2 may be substantially or generally cylindrical. In at least one embodiment, the housing 2 may be substantially hollow to receive the plurality of lens elements 10, 20, 30 and spacers 40, 50 therein. The housing 2 may comprise at least one locking screw 3 which is received through an aperture 4 in the housing 2 and protrudes into the housing 2 to lock the lens elements 10, 20, 30 and spacers 40, 50 in the housing. In at least one embodiment, the locking screw 3 engages with one lens element 10, 20, 30 or spacer 40, 50. In the embodiment shown in FIGS. 1 and 2, the locking screw 3 engages with the outer surface of the third lens element 30, which serves to retain the other lens elements 10, 20 and spacers 40, 50 in the housing 2, preventing their removal.

There may be additional assembly screws 5 which hold the lens assembly 1 together following assembly. In FIGS. 1 and 2, assembly screws 5 hold the heater block 70 and insulator block 60 against the third lens element 30. In other embodiments, the assembly screws may pass through some or all the lens elements and spacers and be received in the housing.

The housing 2 (which may also be referred to as a collar tube) may be made from any electrically and/or thermally insulating material. In at least one embodiment, the housing 2 may be made of 1 of ceramic or an engineering polymer. The housing 2 may be comprised of one of PEEK, alumina, zirconia, macor, chapel, zerodur, ultem and vespel. In use, the temperature of the components held by, or arranged adjacent to, the housing 2 may be heated to temperatures exceeding 150° C. In at least one embodiment, the material of the housing 2 may be selected so as to withstand such temperatures. In at least one embodiment, the housing 2 may be machined.

In at least one embodiment, the housing 2 comprises at least one longitudinally extending slot 6. The slot 6 is for slidably receiving the protrusions 11, 21, 31 of each lens element 10, 20, 30 during assembly. As will be seen in FIGS. 1 and 2, the slot 6 does not necessarily extend the whole length of the housing 2. The housing 2 may further comprise at least one ventilation slot 7 which may substantially align with corresponding ventilation slots 47, 57 in the spacers 40, 50.

The lens assembly 1 may further comprise a heater block 70.

Figure 3:
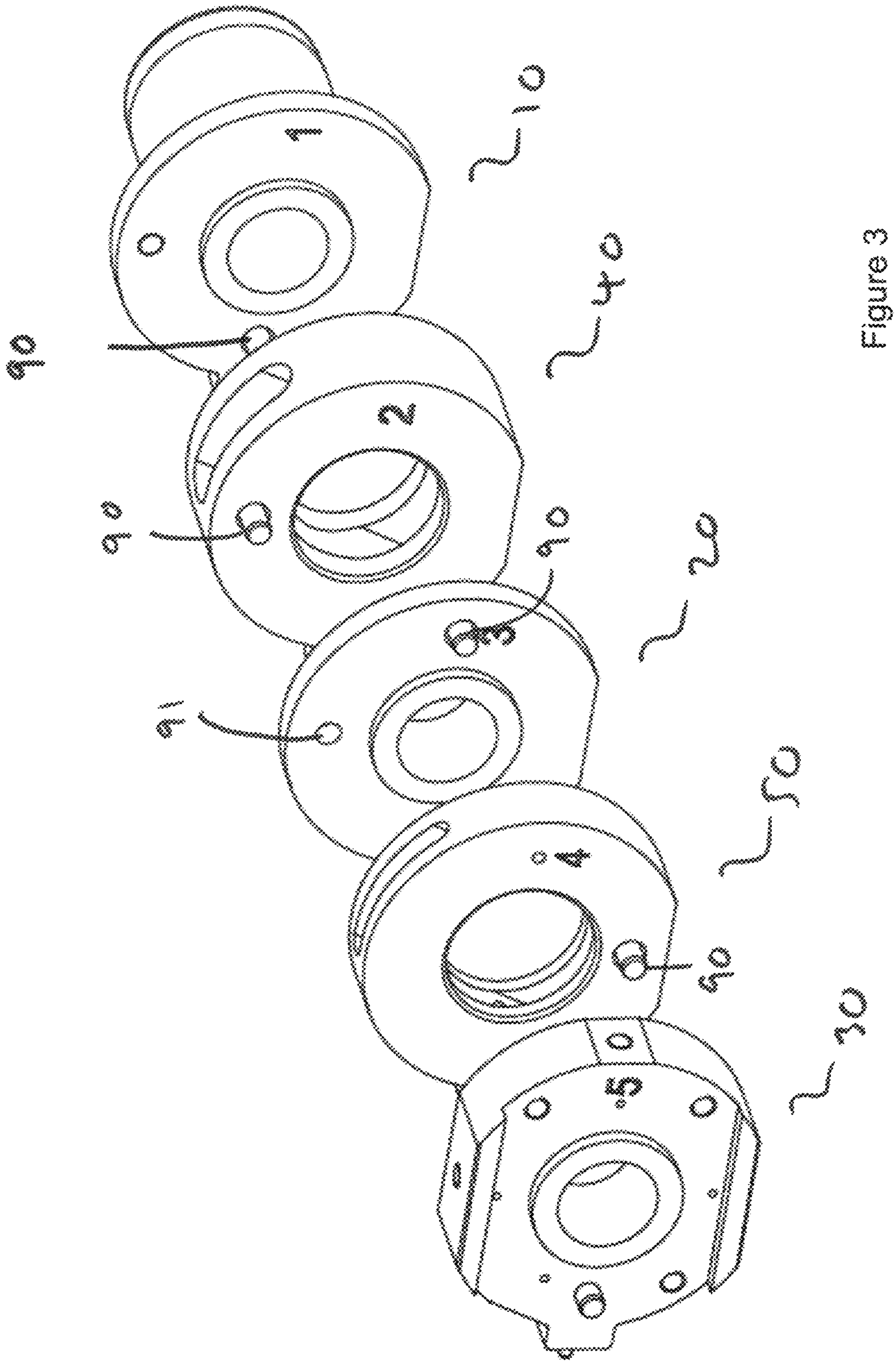
FIG. 3 illustrates an exploded view of the lens elements and spacers of a lens assembly embodying the present invention.

The assembled lens assembly 1 is illustrated in FIGS. 2 and 3, wherein the plurality of lens elements 10, 20, 30 and spacers 40, 50 are arranged in the housing 2 to form a lens stack, to which the heater block 70 may be secured. FIGS. 1 to 3 do not illustrate the interface connector 100.

The lens elements 10, 20, 30, when arranged in a lens stack, serve to guide the fragmented and ionised analyte molecules from an ion chamber (not shown) adjacent the heater block 70 into a mass spectrometer analyser. One of the lens elements 10, 20, 30 may comprise an extraction lens 30, which may be made of magnetic stainless steel (e.g. 410 series). In the embodiment illustrated, the extraction lens 30 further comprises two yoke pedestals 37. The yoke pedestals 37 may also comprise magnetic stainless steel. A permanent magnet 38 may be securable to each yoke pedestal 37. In at least one embodiment, the yoke pedestals 37 are diametrically opposed on the extraction lens 30. In at least one embodiment, the permanent magnets 38 are arranged such that their opposite poles face one another. The yoke pedestals 37 are securable to the lens element 30 by fixing means 39. In use, the magnetic field generated by the permanent magnets 38 help to spatially confine and collimate the thermionic electrons emitted by the filaments inside the ion chamber (not shown). Consequently, the electrons may be caused to spiral with increased path length and probability of impacting and ionizing the analyte molecules.

In at least one embodiment, each yoke pedestal 37 comprises a step 36 which engages with a corresponding surface of the heater block 70, thereby providing relative positional accuracy during assembly. A benefit of such arrangement is that the yoke pedestal 37 and/or magnets 38 may be disassembled, serviced and reassembled with relative case and high repeatability, requiring little or no further calibration or adjustment before the lens assembly 1 is usable.

In use, at least one of the lens elements 10, 20, 30 and heater block 70 may be electrically charged. Each of the lens elements 10, 20, 30 and heater block 70 may be held at substantially different voltages. The voltages may range from −200 to +200 volts. Other voltages are possible. In at least one embodiment, the lens elements 10, 20, 30 and/or heater block 70 are comprised of metal. In at least one embodiment, the metal may be aluminium alloy or steel. The lens elements 10, 20, 30 may all be comprised of different metals.

In the embodiment shown in FIG. 1, the first lens element 10 comprises an orifice 12 which defines the differential pumping boundary that separates the source vacuum from the main analyser vacuum.

The heater block 70 may be made of metal and held at voltage. It may comprise an aperture 71 for receiving the ionisation chamber (not shown) of an inner source assembly, and/or any associated filaments (not shown) in use. The heater block 70 may be heated to temperatures in excess of 150° C. In at least one embodiment, the heater block 70 may be associated with a cartridge heater, either separate to or embedded in the heater block 70. The heater block 70 may comprise a cavity to receive a cartridge heater therein. In at least one embodiment, a cartridge heater is secured to the heater block 70 with two screws (e.g. set screws). This may promote better heat transfer between the cartridge heater and the heater block 70 and/or improve the reliability of the cartridge heater.

The heater block 70 may be mechanically fastened to the lens assembly 1, using assembly screws 5. Electrically insulating washers 72 may be arranged between the heater block 70 and assembly screws 5. In use, an insulating block 60 may be arranged between the lens element 30 (extraction lens) and heater block 70, so as to minimise unwanted heat conduction from the heater block 70 into the lens stack and/or the housing 2. In at least one embodiment, the aperture 71 of the source block 70 may be coated with, or comprises, clear-anodised aluminium to reduce or prevent diffusion bonding with the ionisation chamber of the inner source (not shown) at elevated temperatures during prolonged use. The coating may alternatively comprise titanium nitride or diamond-like carbon (DLC). The insulating washers 72 and/or insulating block 60 may be comprised of ceramic alumina.

In use, the heater block 70 may comprise at least one cartridge heater, a resistance temperature detector (RTD) and corresponding electrical connections.

In at least one embodiment, the lens elements 10, 20, 30 are electrostatic. In at least one embodiment, at least a first lens element 10, 20, 30 may be held at a different electrical potential and/or temperature to a second lens element 10, 20, 30.

Figure 4:
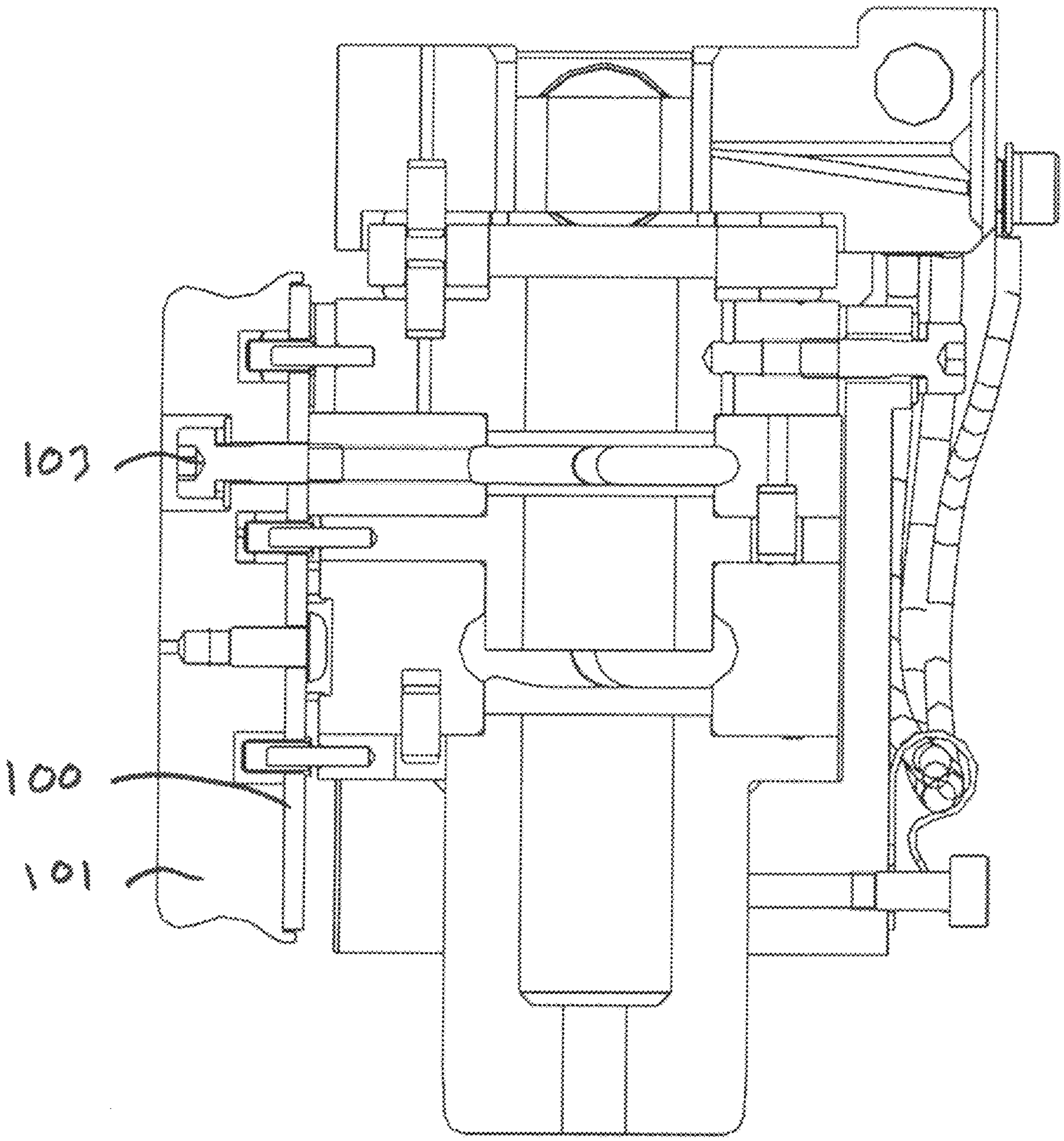
FIG. 4 illustrates a cross-section of a lens assembly embodying the present invention.
Figure 5:
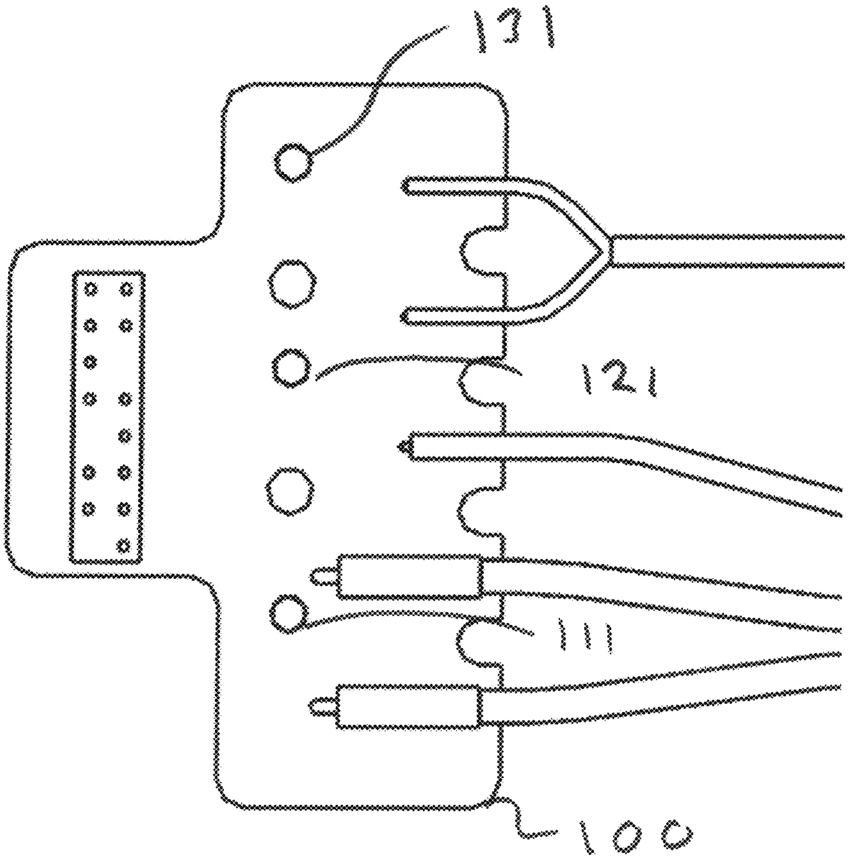
FIG. 5 illustrates an interface connector of a lens assembly embodying the present invention.

An interface connector 100 for the lens assembly 1 is illustrated in isolation in FIG. 5, and shown assembled in FIG. 4. The interface connector 100 comprises a plurality of sockets 111, 121, 131 which are configured to receive the corresponding protrusions 11, 21, 31 of the lens elements 10, 20, 30. The sockets 111, 121, 131 may be substantially equally spaced and substantially in line with one another. However, this is not essential. In at least one embodiment, the spacing between the sockets 111, 121, 131 substantially matches the spacing between the corresponding protrusions 11, 21, 31. In at least one embodiment, the spacing between two neighbouring sockets 111, 121 or protrusions 11, 21 may be different to the spacing between another two apertures 121, 131 and protrusions 21, 31.

In the embodiment illustrated in FIGS. 4 and 5, the interface connector 100 may be a substantially planar article. In at least one embodiment, the interface connector 100 may be arranged generally perpendicularly to the central axes of the protrusions 11, 21, 31. The sockets 111, 121, 131 may be substantially circular and sized so as to receive, with an electrically contacting fit, the corresponding protrusions 11, 21, 31. In at least one embodiment, the sockets 111, 121, 131 may comprise commercially available electrical sockets such as those made by Cambion® Electronics Ltd, UK. In at least one embodiment, the orifice of the sockets may be around 1.5 mm. In at least one embodiment, the interface connector 100 may be a printed circuit board (PCB). In at least one embodiment, the PCB may be comprised at least in part of ceramic. In at least one embodiment, the PCB may be made of a high-temperature-compatible commercially available base material, such as RO4350B available from Rogers Corporation, US, which may be suitable for operating temperatures in excess of 250° C. during prolonged use.

Figure 8:
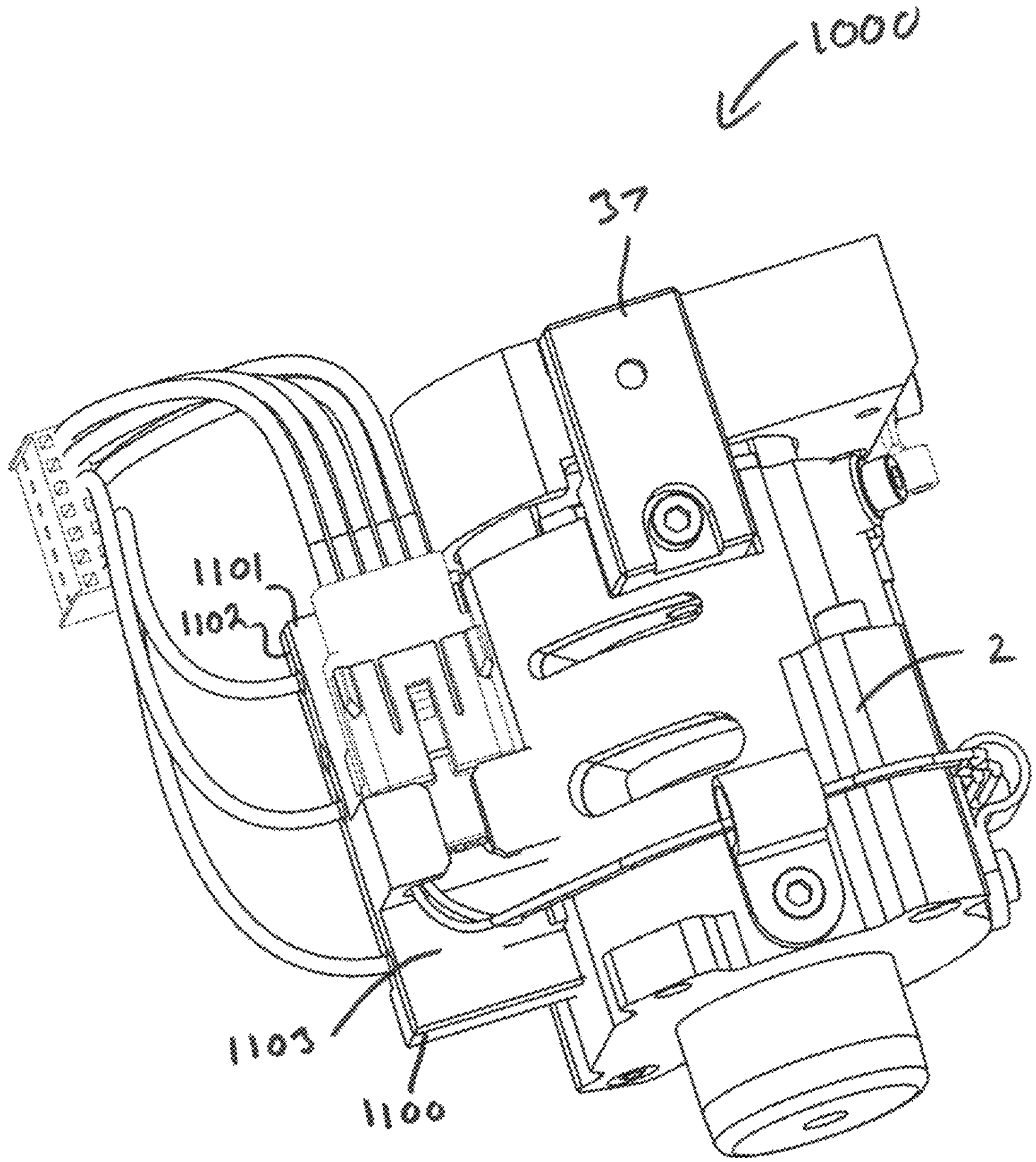
FIG. 8 illustrates a lens assembly embodying the present invention.

In the embodiment shown in FIG. 4, the interface connector 100 may be arranged generally perpendicularly to the axes of the protrusions 11, 21, 31. In an alternative arrangement, shown in FIG. 8, the interface connector 1000 may be comprised of two mating plates 1101, 1102. A surface of each of the plates 1101, 1102 comprises a plurality of channels 1103. When the plates 1101, 1102 are mated together, the respective channels 1103 together define sockets 1111, 1121, 1131 for receiving the protrusions 11, 21, 31 therein. In the arrangement in FIG. 8, the plane of the interface connector 1000 may be generally parallel to the axis of the protrusions 11, 21, 31. The central axes of the protrusions 11, 21, 31 lie within the central plane of the interface connector 1000. Alternatively, the interface connector 1000 may be made as a single item, with sockets formed or defined therein, for receiving the protrusions 11, 21, 31. In at least one embodiment, the components of the interface connector 1000 are comprised of a vacuum compatible plastic material, such as PEEK or Vespel. Effectively, the two plates 1101, 1102 may act as a two-part clamp. In at least one embodiment, Cambion sockets may be arranged between, and clamped by, the two plates 1101, 1102.

The lens elements 10, 20, 30 each comprise at least a generally planar flange 13, 23, 33. The outer circumference of the flanges 13, 23, 33 comprises at least one flat portion 14, 24, 34. In the embodiment shown, the flats 14, 24, 34 of each of the lens elements 10, 20, 30 are substantially the same and aligned with one another when the arrangement is assembled. In the embodiment shown, the angular arrangement of the protrusions 11, 21, 31 of the lens elements 10, 20, 30 relative to the flat portion(s) 14, 24, 34 may be substantially the same. Accordingly, in use, if the flat portions 14, 24, 34 of the lens elements 10, 20, 30 are arranged substantially aligned (e.g. co-planar) with one another, the protrusions 11, 21, 31 will be correspondingly aligned with one another. In at least one embodiment, the inner surface of the housing 2 may be shaped with a corresponding flat portion, against which the flat portions 14, 24, 34 of at least some of the lens elements 10, 20, 30 engage and align in use. The relative arrangement of the flat portions 14, 24, 34 and the protrusions 11, 21, 31 of the lens elements 10, 20, 30 is such that they are only receivable in the housing 2 in a single orientation.

The protrusions 11, 21, 31 may be provided on radially extending bosses 15, 25, 35. The radial height of the bosses 15, 25, 35 may be substantially equal to the thickness of the wall of the housing 2 such that when the lens elements 10, 20, 30 are assembled in the housing 2, the upper surface of the bosses 15, 25, 35 may be substantially flush with the outside surface of the housing 2, or slightly proud therefrom, as shown in FIG. 2. Conveniently, this enables the protrusions 11, 21, 31 to stand proud of the housing to facilitate electrical connection with the interface connector 100.

The spacers 40, 50 may be comprised of engineering polymer and/or ceramic. The spacers 40, 50 are interspersed between the lens elements 10 20, 30 to form a lens stack. A benefit of the spacers 40, 50 is that they thermally (at least to some extent) and/or electrically isolate the lens elements 10, 20, 30 from one another. Accordingly, one or more of the lens elements 10, 20, 30 may be selectively heated so as to minimise material adsorption onto the optics, maintain their cleanliness and/or prolong the maintenance interval.

The ventilations slots 47, 57 on the spacers 40, 50 may align with the corresponding apertures 7 in the housing 2, when assembled.

The lens element 10, 20, 30 may also serve as a relatively high precision mechanical guide, geometric constraint and/or mounting support to adjacent components, (for example, the spacers 40, 50). Consequently, the lens assembly 1 may be simple and robust, and substantially fool proof to assemble and disassemble. In at least one embodiment, the arrangement allows for a stacked lens assembly concentricity tolerance of substantially at least 100 microns. Moreover, the arrangement promotes concentricity of the lens assembly 1 with other associated components and/or assemblies, for example the outer inner source, analyser and/or detector. The arrangement also promotes concentricity of the lens stack assembly and associated components and/or assemblies without using any tools.

In at least one embodiment, at least one of the lens elements 10, 20, 30 and/or spacers 40, 50 comprises opposing axial faces, each face provided with one of a keying protrusion 90 and a keying recess 91 to engage with a corresponding keying recess 91 or keying protrusion 90 on an axial face of adjacent lens element 10, 20, 30 and/or spacer 40, 50. In other words, one of the lens elements 10, 20, 30 and spacers 40, 50 comprise one of a pair of complementary keying features 90, 91 and the neighbouring lens elements 10, 20, 30 or spacers 40, 50 comprise the other of a pair of complementary keying features 91, 90.

In the embodiment shown, the keying protrusion 90 may be a circular peg and the keying recess 91 may be a cylindrical recess. This is not essential. The keying protrusion 90 and keying recess 91 may take other forms.

In at least one embodiment, the arrangement of complementary keying features 90, 91 are unique to each mating pair of the lens assemblies 10, 20, 30 and spacers 40, 50. Consequently, the lens elements 10, 20, 30 and spacers 40, 50 may only be arranged and mated with one another in a predetermined (single) configuration. In at least one embodiment, one or more of the lens elements 10, 20, 30 and spacers 40, 50 may alternatively or additionally be colour coded and/or provided with numerical and/or alphabetical indicia, prompting a user to assemble the lens assembly 1 in a predetermined order. In at least one embodiment, if a user attempts to assemble the lens elements 10, 20, 30 and spacers 40, 50 in a configuration other than intended, the parts will not mate together. Consequently, the spacing between the protrusions 11, 21, 31 of the (incorrectly assembled) lens elements 10, 20, 30 will not allow them to be either received in the apertures 111, 121, 131 of the interface connector 100 or inserted properly into the housing 2. In at least one embodiment, the positioning of the keying feature 90, 91 on a respective one of the lens elements 10, 20, 30 and spacers 40, 50 relative to the protrusions, 11, 21, 31 and/or flats 14, 24, 34, 44, 54, may be unique to each of the lens elements 10, 20, 30 and spacers 40, 50.

As shown in FIG. 4, the interface connector 100 may be housed within an interface housing 101. Alternatively, the interface connector 100 may be sandwiched between an interface housing 101 and the housing 2 of the lens assembly 1. Where the length of the protrusions 11, 21, 31 is longer than the thickness of the interface connector 100, the inside face of the interface housing 101 includes apertures to receive the distal ends of the protrusions 11, 21, 31. In at least one embodiment, the interface housing may be formed of PEEK. In the embodiment shown, the interface housing may be securable to the housing 2 of the lens assembly 1 by a single screw 103 to allow case of assembly. The interface connector 100 further comprises a socket 104 for electrical connection to associated components. The interface housing 101 may comprise a finger grip surface for case of handling.

Figure 6:
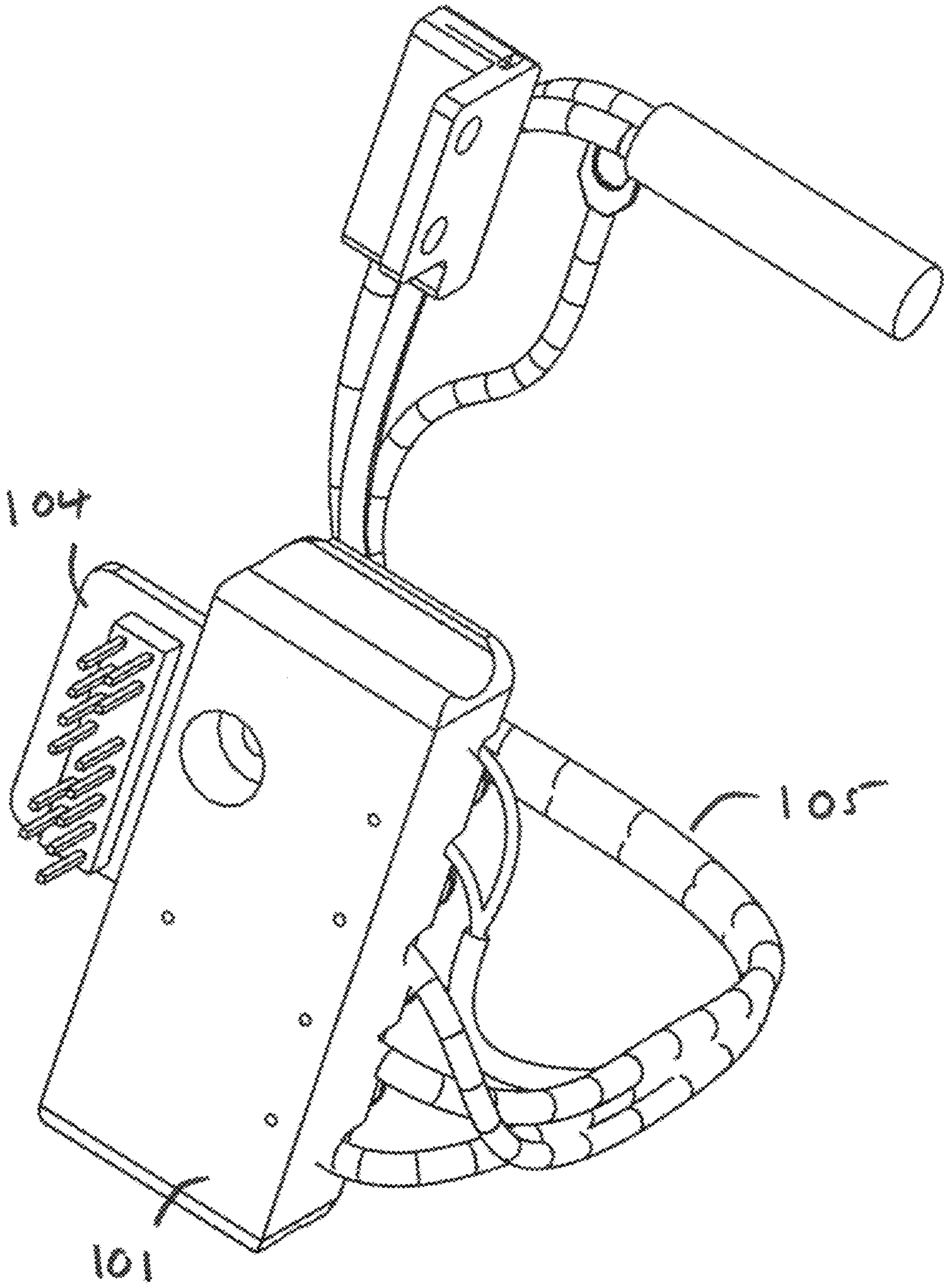
FIG. 6 illustrates a wiring loom and interface connector assembly.

The lens assembly 1 may further comprise a first wiring loom 105 (FIG. 6), which may be electrically connected at a proximal end to the sockets 111, 121, 131 of the interface connector 100. The distal end of the wiring loom 105 may be provided with various components for connection to the lens assembly, including, but not limited to, an RTD and/or electrical connections for the heater block 70 and/or associated cartridge heater.

FIG. 7 schematically illustrates the lens assembly 1 assembled into a mass spectrometer housing 300. The arrangement illustrated in FIG. 7 shows the top of the heater block 70 and part of the interface housing 101 with embedded interface connector 100 therein, and the socket 104 associated with the interface connector 100. Additionally, FIG. 7 illustrates a secondary wiring loom 200 for connection between the interface connector 100 and the mass spectrometer 300. A first plug 201 may be provided at a first end of the secondary wiring loom 200 and a second plug 202 may be provided at the other end. The first plug 201 may be securable in the socket 104. The second plug 202 may be securable in a corresponding socket on the mass spectrometer housing which may, in turn, be electrically connected to a sub-assembly (such as a feed-through PCB) on the mass spectrometer housing 300.

A benefit of the use of the interface connector is that it allows for the establishment of the correct assembly of the lens assembly 1. If the interface connector 100 is able to receive the protrusions 11, 21, 31 of the lens elements 10, 20, 30, then this provides confirmation to the user that the assembly is assembled correctly. The use of the wiring loom 105 for connection to associated components effectively manages the various cables and wires on the arrangement, and avoids the need for a user to separately connect and disconnect various components. In at least one embodiment, all electrical connections to and from the lens assembly 1 are made via the socket 104. By connecting the various components to the socket 104 prevents a user inadvertently misconnecting any of the components which could cause damage thereto. It is effectively 'fool proof'.

A benefit of an assembly embodying the claimed invention is that it allows the safe electrical connection of the components. Another benefit may be that the assembly is relatively quick and straightforward for an average user to assemble. Embodiments of the invention may reduce instrument downtime since the disassembly, cleaning and reassembly of the outer source arrangement may be performed more quickly than conventional arrangements.

A Housing for a Resistance Temperature Detector

Another aspect of the present invention provides a housing 150 for a resistance temperature detector (RTD) 170. The RTD 170 generally comprises a detector module 175 and an extension cable 173 extending therefrom.

The detector module 175 comprises a detector body 171 and a sensing element 172 protruding/extending therefrom. In the embodiment shown, the sensing element 172 and extension cable 173 extend from the detector body 171 in opposing directions.

A pair of extension wires (not shown) may be soldered or otherwise electrically connected to the sensing element 172. The detector body 171, which may be comprised at least in part of thermal cement, protects the fragile joints between the extension wires and the sensing element 172, and reinforces the mechanical connection therebetween. The proximal end of the extension cable 173 may also be anchored within the detector body 171. The extension wires pass through the detector body 171 and into the extension cable 173, for connection to circuitry at the distal end of the extension cable 173.

The sensing element 172 of a known surface-mountable RTD can be a loop of lithographically-deposited platinum tracks of a predetermined resistance, e.g., 100 ohms at 0° C., encapsulated between a flat ceramic backing and a protective coating. References to the 'sensing element 172' herein are intended also to refer to any such backing and/or coating that is applied to or other encapsulates the sensing element 172.

The RTD is for measuring the temperature of an item. In use, the sensing element 172 must be in physical contact with the surface of which the temperature is to be measured. In at least one embodiment, the sensing element 172 may also serve as a mechanical securing flange for securing the RTD 170 to the item to be measured.

Figure 9A:
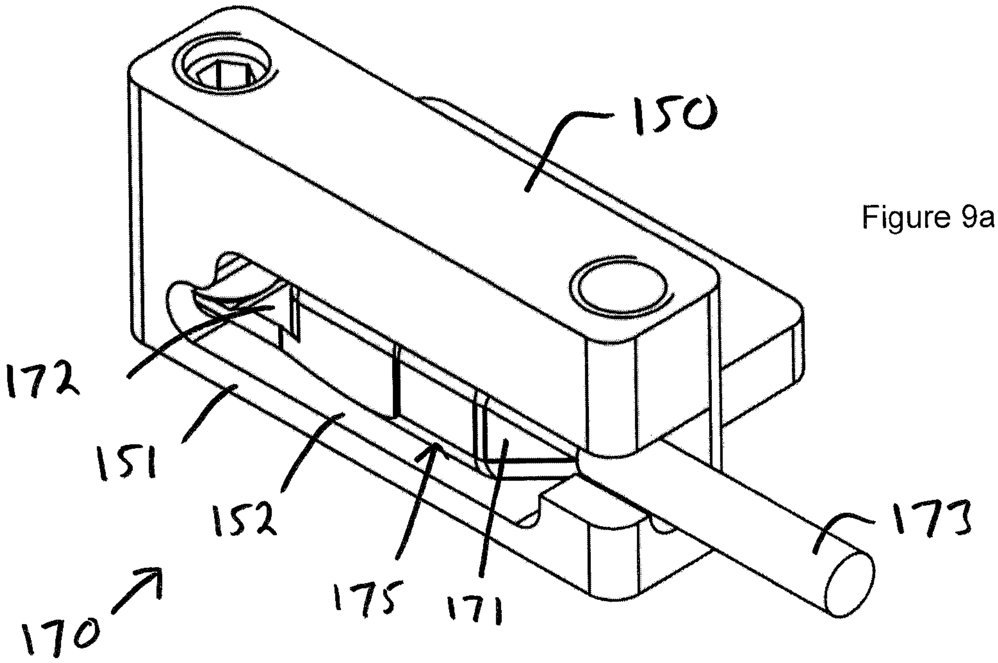
FIGS. 9*a*-9*c* illustrate a housing for an RTD embodying the present invention.

The housing 150 comprises a cavity 151 to receive the RTD 170. As shown in FIG. 9*a*, the axial end of the housing 150 is open to receive the extension cable 173 of the RTD 170 therethrough. In the embodiment shown, the housing 150 comprises an access aperture 152 for receiving the detector module 175 therein. The access aperture 152 represents a mouth of the cavity 151. The access aperture 152 extends substantially along the length of the housing 150 and, in at least one embodiment, may be longer than the detector module 175.

In at least one embodiment, a top surface of the housing 150 comprises first 156 and second 158 apertures, extending through to the cavity 151. In at least one embodiment, the apertures 156, 158 are threaded.

A first fastener 155 may be receivable in the first aperture 156 to removably secure the extension cable 173 of the RTD 170 to the housing 150. In at least one embodiment, the first fastener 155 may be a threaded grub screw. The tip of the first fastener 155 may have cable engaging (e.g. gripping) features, or may be substantially flat. In at least one embodiment, the tip of the first fastener 155 may be designed so as not to cause damage to the extension cable 173 but to substantially hold the extension cable 173 in place and substantially prevent movement. By securing the extension cable 173 relative to the housing 150, any subsequent forces due to the flexing of the extension cable 173 outside of the housing 150 should be avoided or reduced from being transferred to the junction between the cable 173 and the detector body 171. By securing the extension cable 173 relative to the housing 150, the RTD 170 and its sensing element 172 should remain substantially stationary despite external forces and disturbances being applied to the cable 173.

A second fastener 157 may be receivable in the second aperture 158, to removably secure the detector module 175 to the housing 150 to ensure the sensing element 172 is in physical and thermal contact with the housing 150.

In the embodiment shown in FIG. 9, the second fastener 157 engages directly with the upper surface of the sensing element 172 of the detector module 175. A benefit of this arrangement is that the force from the second fastener 157 is applied directly to the part of the RTD 170 which detects the temperature of the surface with which the RTD is in contact. This may ensure good physical and thermal contact between the base of the sensing element 172 and the surface being measured.

In another embodiment, not shown, the second fastener 157 may engage with an upper surface of the detector body 171. Since the sensing element 172 extends from the detector body 171, by urging the detector body 171 into contact with the surface to be measure, the sensing element 172 may correspondingly be urged into physical and thermal contact.

In at least one embodiment (not shown), the end of the second fastener 157 may engage (either directly or through an additional force distribution component) with a least a part of both the sensing element 172 and detector body 171. In at least one embodiment (not shown), there may be second 157 and third fasteners, each to engage with a respective one of the sensing element 172 and detector body 171.

The embodiments described below and illustrated in FIGS. 9 and 10 comprise the second fastener 157 in contact with the sensing element 172. However, as envisaged above, the features may apply equally to an embodiment in which the second fastener 157 is in contact with the detector body 171/

In at least one embodiment, the second fastener 157 may be a ball plunger, comprising a cartridge 159 receiving a ball 160 therein. A resilient element (not shown) may be provided between the cartridge 159 and ball 160, to urge the ball 160 out of the cartridge 159. The ball plunger may be configured to apply a predetermined force on the sensing element 172 in use.

The housing 150 may comprise a base 165, presenting a substantially planar surface. When the RTD 170 is arranged in the housing 150, the sensing element 172 may be substantially in physical thermal contact with the base 165 of the housing 150. The force applied by the second fastener 157 ensures that adequate thermal contact between the sensing element 172 and the base 165 is maintained. Consequently, the temperature of the housing 150 (and thus any component to which the housing may be secured) can be reliably measured by the RTD 170 arranged therein.

Figure 9B:
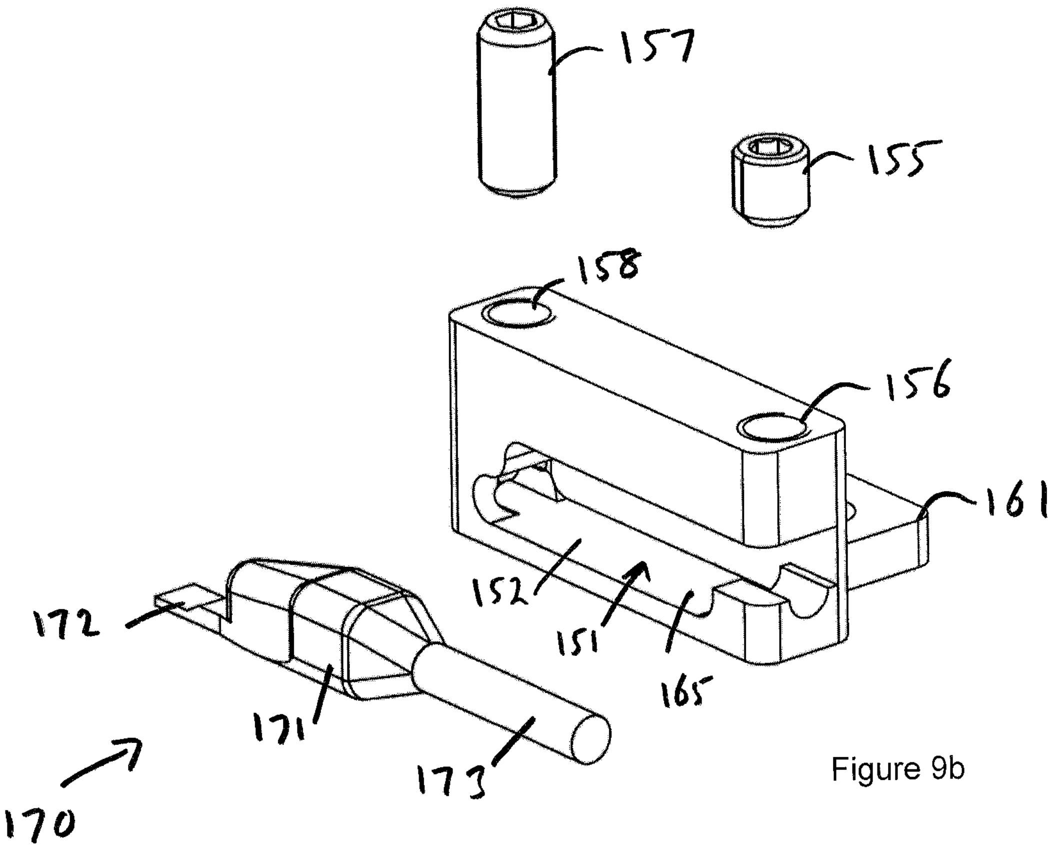
Figure 9C:
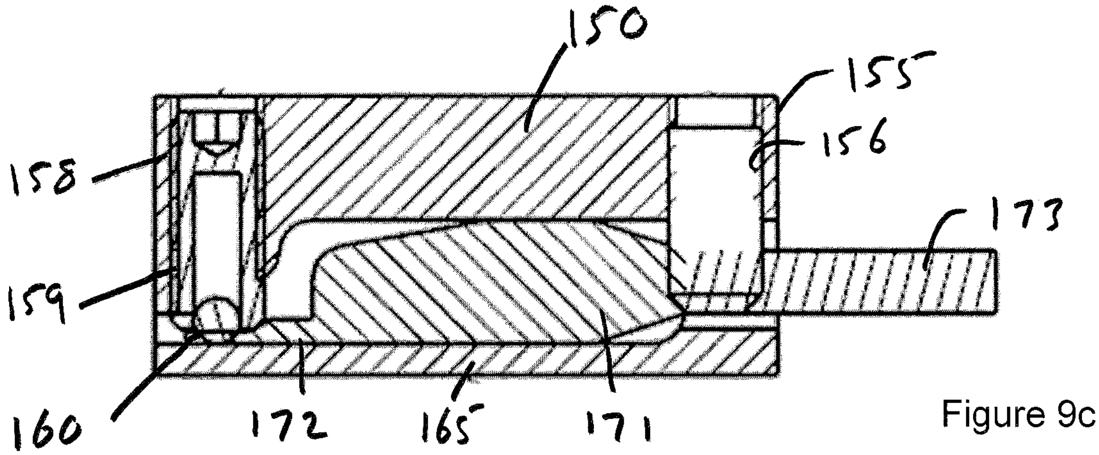
Figure 10A:
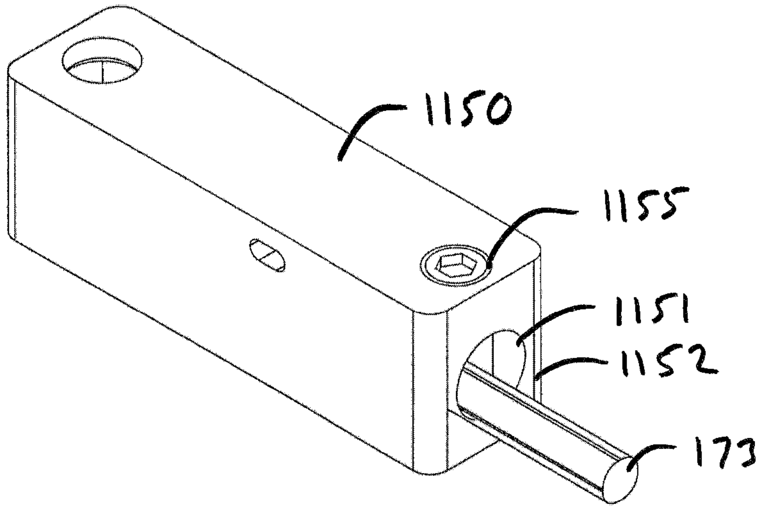
FIGS. 10*a* and 10*b* illustrate another housing for an RTD embodying the present invention.
Figure 10B:
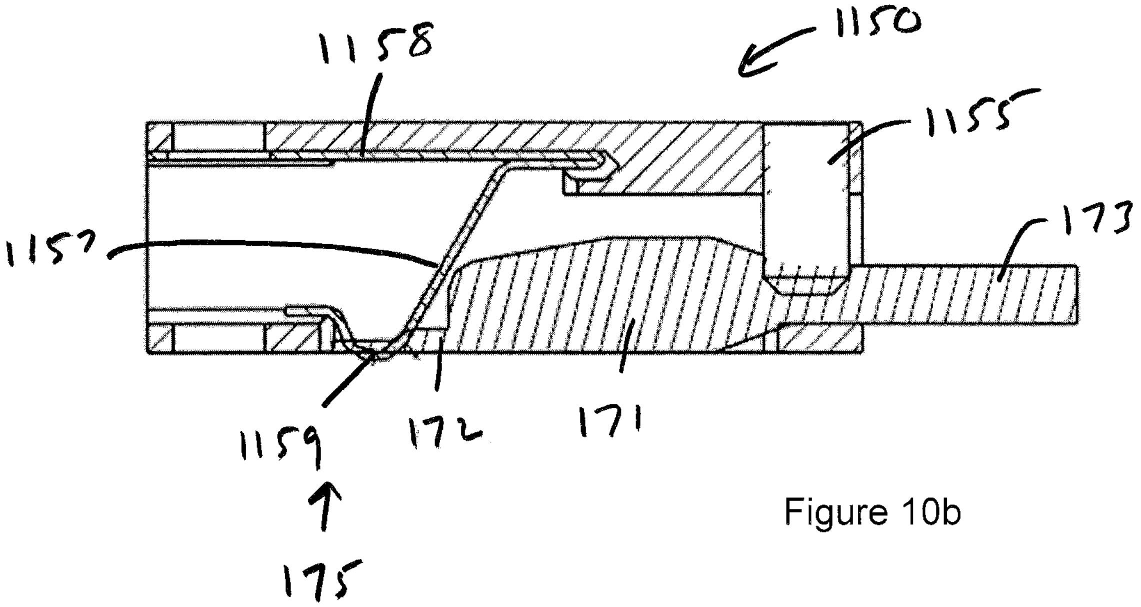

An alternative housing 1150 is illustrated in FIGS. 10*a* and 10*b*. The general shape of the housing 1150 may be similar to that illustrated in FIGS. 9*a* to 9*c*. A first access aperture 1152 may be provided on the axial end of the housing 1150. The first access aperture 1152 may be sized so as to receive the detector module 175 therethrough. Alternatively, the first access aperture 1152 may only be sized to receive the extension cable 173 therethrough, and the detector module 175 may be assembled through a second access aperture at the opposing axial end.

In the embodiment of the housing 1150 illustrated in FIGS. 10*a* and 10*b*, the second fastener may be a spring 1157, configured to apply a predetermined force on the sensing element 172.

In the embodiments illustrated, the second fastener 157 and spring 1157 engage with the sensing element 172 of the RTD 170 directly. This is not essential. The second fastener 157 and spring 1157 may instead (or additionally) engage with the body 171 of the RTD 170, or any part which allows the application of an appropriate force to be applied on the sensing element 172.

The spring 1157 may comprise a first leg 1158 and second leg 1159. The first leg 1158 may be retained against the housing 1150, and the second leg 1159 is urged away from the first leg 1158 by a spring force. The second leg 1159 engages either directly with the sensing element 172 or body 171 of the RTD 170 to apply a force thereto.

In the embodiment illustrated in FIGS. 10*a* and 10*b*, the base of the housing 1150 may be open, such that the sensing element 172 may engage directly with a surface to be measured. The second fastener (e.g. spring 1157) applies a force to the sensing element 172 to urge it into thermal contact with a surface to be measured. This may ensure a more effective thermal engagement, increasing the sensitivity and accuracy of temperature measurements taken by the RTD 170.

The housing 150 of FIGS. 9*a* to 9*c* may, alternatively, by open as with the housing 1150 of FIGS. 10*a* and 10*b*. Likewise, the spring element 1157 may equally be used with an enclosed housing like with the arrangement shown in FIGS. 9*a* to 9*c*. The open/closed base of the housing and the spring/ball plunger features are interchangeable.

In at least one embodiment, housing 150, 1150 may comprise aluminium alloy or nickel-aluminium-bronze alloy.

The housing 150, 1150 may further comprise a mounting flange 161 for securing the housing 150, 1150 to an item to be measured. The mounting flange 161 may comprise apertures for securement.

Figure 11:
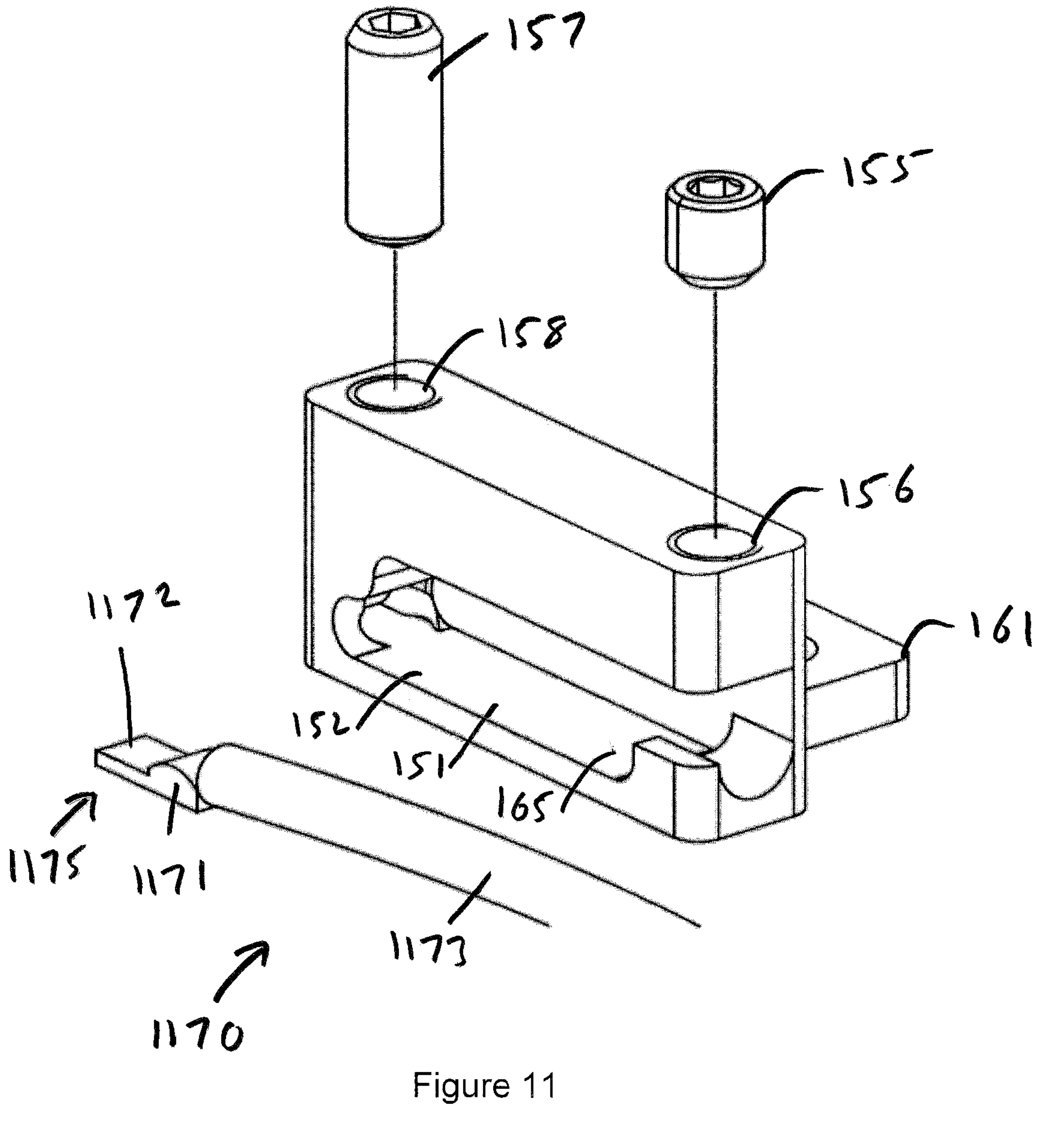
FIG. 11 illustrates the housing of FIGS. 9*a*-9*c* holding a different form of RTD.

FIG. 11 illustrates the same housing 150 as in FIGS. 9*a* and 9*b*, but the RTD 1170 has a different form factor to the RTD 170 of FIGS. 9*a* and 9*b*. The RTD 1170 comprises a detector module 1175 and an extension cable 1173 extending therefrom. The detector module 1175 comprises a detector body 1171 and a sensing element 1172 protruding/extending therefrom. The physical arrangement of features of the RTD 1170 is therefore generally the same as that of the RTD 170, but the RTD 1170 is smaller in form. Nevertheless, the housing 150 still ensures that the sensing element 1172 is in physical and thermal contact with the housing 150. The RTD 1170 may equally be adopted with the housing 1150 illustrated in FIGS. 10*a* and 10*b*.

A benefit of embodiments of the present invention is that a good thermal connection may be established between the sensing element 172 and the surface to be measured. Conventional RTDs are known to be mounted in protective lugs or casings, and secured therein by thermal cement or paste. While such an arrangement may allow accurate temperature measurements between certain temperature ranges, it has been found that such ‘potted’ RTDs are not accurate at high temperatures and/or environments that are in either partial or full vacuum. Both high temperature and vacuum may cause the thermal cement or paste to degrade and outgas, and thus prevent an accurate reading being taken since gas is a poor thermal conductor.

When RTDs are used in high vacuum environments, it is important that there is no gap between the RTD sensing element (particularly the sensing element) and the surface being measured. Otherwise, with substantially no air between the two surfaces, a thermal insulating gap will be formed. Embodiments of the present invention ensure that there is a good physical thermal contact between the sensing element 172 and the surface being measured, ensuring suitable performance in vacuums and at high temperatures.

When used in this specification and claims, the terms “comprises” and “comprising” and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Lens Assembly

A1 A lens assembly for an outer source of a mass spectrometer, the assembly comprising:

a housing;

a plurality of lens elements, each lens element comprising a radially extending electrically conductive protrusion, the lens elements being linearly arranged in the housing such that the protrusions are aligned with one another; and an interface connector having a plurality of sockets to receive the protrusions therein and create an electrical connection between the protrusions and sockets.

A2. A lens assembly according to clause A1, wherein the housing is substantially cylindrical.

A3. A lens assembly according to any of clauses A1 to A2, wherein the housing is comprised of an electrically insulating material.

A4. A lens assembly according to any of clauses A1 to A3, wherein the housing is comprised of ceramic or an engineering polymer.

A5. A lens assembly according to any of clauses A1 to A4, wherein the housing is comprised of one of PEEK, alumina, zirconia, macor, shapel, zerodur, ultem and Vespel.

A6. A lens assembly according to any of clauses A1 to A5, wherein the housing comprises a slot extending longitudinally for slidably receiving the protrusions of each lens element during assembly.

A7. A lens assembly according to any of clauses A1 to A6, wherein the lens elements are electrostatic.

A8 A lens assembly according to any of clauses A1 to A7, wherein at least a first lens element is held at a different electrical potential to a second lens element.

A9 A lens assembly according to any of clauses A1 to A8, wherein the lens elements are comprised at least in part of metal or metal alloy.

A10. A lens assembly according to any of clauses A1 to A9, wherein the interface connector is substantially planar and is arranged generally perpendicularly to the axes of the protrusions.

A11. A lens assembly according to any of clauses A1 to A10, wherein the interface connector is a PCB.

A12. A lens assembly according to clause A11, wherein the PCB is comprised at least in part of ceramic or one of Rogers 4000 Series laminates.

A13. A lens assembly according to any of clauses A1 to A12, wherein the interface connector comprises two plates which are sandwiched together to define sockets to receive the protrusions.

A14. A lens assembly according to any of clauses A1 to A12, wherein the plane of the interface connector is parallel to the protrusions.

A15. A lens assembly according to any of clauses A1 to A14, further comprising a plurality of spacers, each spacer being arranged in the housing between a pair of adjacent lens elements.

A16. A lens assembly according to any of clauses A1 to A15, wherein the spacers are formed of substantially thermally and/or electrically insulating material.

A17 A lens assembly according to any of clauses A1 to A16, wherein at least one of the lens elements and/or spacers comprise opposing axial faces, each face provided with one of a keying protrusion and a keying recess, to engage with a corresponding keying recess or keying protrusion on an adjacent lens element and/or spacer.

A18. A lens assembly according to clause A17, wherein the keying protrusions and/or keying recesses are uniquely positioned in each lens element and/or spacer.

A19 A lens assembly according to any of clauses A1 to A18, wherein the lens elements and/or spacers are only receivable in the housing in a single orientation and sequence.

A20. A lens assembly according to any of clauses A1 to A19, wherein the housing comprises at least one locating protrusion, and the interface panel comprises an alignment aperture to receive the locating protrusion.

A21 A lens assembly according to any of clauses A1 to A20, further comprising at least one heater to selectively heat one or more of the lens elements.

A22. A lens assembly according to any of clauses A1 to A21, further comprising at least one heater associated with each lens element to selectively heat the associated lens element.

A23. A lens assembly according to any of clauses A1 to A22, further comprising a source block.

A24. A lens assembly according to any of clauses A1 to A23, further comprising a heater associated with the source block.

A25. A lens assembly according to clause A24, wherein at least a part of the surface of the source block is coated.

A26 A lens assembly according to clause A25, wherein the coating is one of anodized aluminum, titanium nitride and diamond-like carbon (DLC).

A27. A lens assembly according to any of clauses A23 to A26, further comprising an insulator arranged between the source block and housing.

A28. A lens assembly according to clause A27, wherein the insulator is formed at least in part of one of PEEK, alumina, zirconia, macor, shapel, zerodur, ultem and Vespel.

A29. A lens assembly according to any of clauses A1 to A28, further comprising a cover which at least partially house the interface connector.

A30. A lens assembly according to A29, wherein the cover is formed of PEEK.

A31 A lens assembly according to any of clauses A1 to A30, wherein the interface connector is removably secured to the housing with a single screw.

A32. A lens assembly according to any of clauses A1 to A31, wherein the lens elements or spacers comprise an axially extending boss configured to be received in a corresponding aperture in the other of the spacers or lens element, to provide axial alignment between the lens elements and the spacers.

A33. A lens assembly according to any of clauses A1 to A32, wherein the lens elements and/or spacers comprise keying protrusions and corresponding alignment slots.

A34. A lens assembly according to any of clauses A1 to A33, further comprising at least one yoke pedestal for receiving at least one magnetic element thereon.

A35. A lens assembly according to clause A34, wherein the at least one yoke pedestal is securable to one of the lens elements.

A36. A lens assembly according to any of clauses A1 to A35, further comprising a wiring loom.

A37. A lens assembly according to clause A36, wherein the wiring loom is connected at a first end to the interface connector and at a second end to at least one connector for communication with a component of the lens assembly.

A38. A mass spectrometer comprising a housing having an electrical socket interface, further comprising lens assembly according to any of clauses A1 to A37, further comprising a connector lead connected between the electrical socket interface on the mass spectrometer housing and the interface connector of the lens assembly.

A39. A lens assembly for an outer source of a mass spectrometer, the assembly comprising:

a plurality of lens elements; and a plurality of spacers, interspersed between the lens elements to form a lens stack with a spacer between each neighbouring pair of lens elements, wherein each of the lens elements and spacers comprise opposing first and second axial faces, wherein at least one axial face of a lens element or spacer comprises one of a pair of complementary keying features and the opposing axial face of a neighbouring spacer comprises the other of the pair of complementary keying features.

A40. A lens assembly according to clause A39, wherein the pairs of complementary keying features are unique to the lens assembly.

A41 A lens assembly according to any of clauses A39 and A40, wherein the lens elements and spacers may only be mated with one another in a predetermined single configuration.

A Housing for a Resistance Temperature Detector

B1. A housing for a resistance temperature detector having a detector module and an extension cable, the housing comprising:

a housing body having a cavity to receive the detector module;

a first fastener to removably secure the extension cable of the detector to the housing; and a second fastener to removably secure the detector module in the housing.

B2. A housing according to clause B1, wherein the first fastener is a threaded grub screw received in a threaded aperture in the housing body.

B3. A housing according to any of clauses B1 to B2, wherein the tip of the first fastener is substantially flat.

B4. A housing according to any of clauses B1 to B3, wherein the second fastener is a ball plunger, configured to apply a predetermined force on the detector module.

B5 A housing according to any of clauses B1 to B4, wherein the second fastener is a spring, configured to apply a predetermined force on the detector module.

B6. A housing according to any of clauses B1 to B5, wherein the base of the housing body is open, and the second fastener applies a force to the detector module to urge it into thermal contact with a surface to be measured.

B7 A housing according to any of clauses B1 to B5, wherein the base of the housing body is closed, and the second fastener applies a force to the detector module to urge it into contact with the base of the housing body.

B8. A housing according to any of clauses B1 to B7, wherein the housing body comprises aluminium alloy or nickel-aluminium-bronze alloy.

B9 A housing according to any of clauses B1 to B8, wherein the housing comprises a mounting flange provided with apertures for securing the housing to a surface to be measured.

B10. A housing according to any of clauses B1 to B9, wherein the housing body comprises an access aperture for receiving the detector therein.

B11 A housing according to clause B10, wherein the access aperture is on the side of the body, extending generally between the first and second fasteners.

B12. A housing according to any of clauses B1 to B11, wherein the detector module comprises a detector body and a sensing element, wherein the sensing element extends from the detector body.

B13. A housing according to clause B12, wherein the second fastener is configured to removably secure the sensing element in the housing.

B14. A housing according to clause B12 or B13, wherein the second fastener is configured to apply a predetermined force on the sensing element.

What is claimed is:

1. A lens assembly for an outer source of a mass spectrometer, the assembly comprising:

a plurality of lens elements; and a plurality of spacers, interspersed between the lens elements to form a lens stack with a spacer between each neighbouring pair of lens elements, wherein each of the lens elements and spacers comprise opposing first and second axial faces and, wherein at least one axial face of a lens element or spacer comprises one of a pair of complementary keying features and the opposing axial face of a neighbouring spacer or lens element comprises the other of the pair of complementary keying features, wherein the pair of complementary keying features are uniquely positioned in each lens element and/or spacer.

2. A lens assembly according to claim 1, wherein the lens assembly further comprises a housing, the lens stack being arranged in the housing.

3. A lens assembly according to claim 2, wherein the lens elements and/or spacers are only receivable in the housing in a single orientation and sequence.

4. A lens assembly according to claim 2, wherein each lens element comprises a radially extending electrically conductive protrusion, the lens elements being linearly arranged in the housing such that the radially extending electrically conductive protrusions are aligned with one another.

5. A lens assembly according to claim 4, wherein the housing comprises a slot extending longitudinally for slidably receiving the radially extending electrically conductive protrusions of each lens element during assembly.

6. A lens assembly according to claim 4, wherein the positioning of each complementary keying feature on a respective one of the lens elements and spacers relative to the protrusions of the lens element is unique to each of the lens elements and spacers.

7. A lens assembly according to claim 4, wherein the lens assembly further comprises an interface connector having a plurality of sockets to receive the protrusions therein and create an electrical connection between the protrusions and sockets.

8. A lens assembly according to claim 2, wherein the lens elements each comprise at least a generally planar flange, the outer circumference of each flange comprising at least one flat portion.

9. A lens assembly according to claim 8, wherein the lens elements are arranged in the housing such that the flat portions of the lens element are substantially aligned with one another.

10. A lens assembly according to claim 8, wherein an inner surface of the housing is shaped with a corresponding flat portion against which the flat portion of at least one of the lens elements is configured to engage and align.

11. A lens assembly according to claim 8, wherein the positioning of each complementary keying feature on a respective one of the lens elements and spacers relative to the flat portion of the lens element is unique to each of the lens elements and spacers.

12. A lens assembly according to claim 1, wherein the pair of complementary keying features comprises a keying protrusion and a keying recess.

13. A lens assembly according to claim 1, wherein one or more of the lens elements are colour coded and/or provided with numerical and/or alphabetical indicia such that a user is prompted to assemble the lens assembly in a predetermined order.

* * * * *